Sept. 25, 1934. G. F. MYERS 1,974,688
TALKING MOTION PICTURE MACHINE
Original Filed Sept. 23, 1929 2 Sheets-Sheet 1

INVENTOR
George Francis Myers.
BY
ATTORNEY

Sept. 25, 1934.   G. F. MYERS   1,974,688
TALKING MOTION PICTURE MACHINE
Original Filed Sept. 23, 1929   2 Sheets-Sheet 2
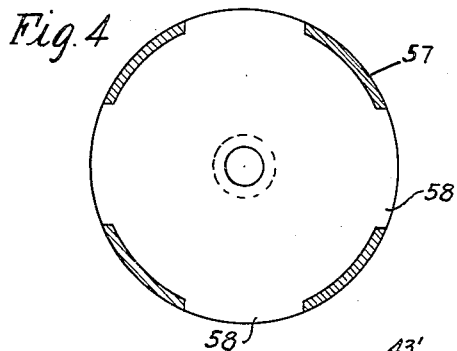
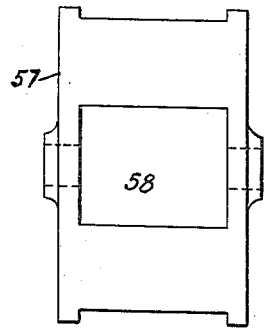
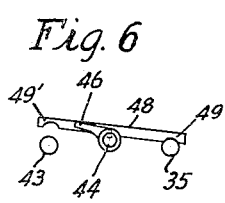
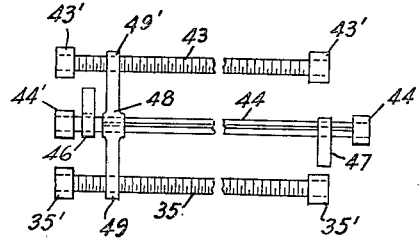
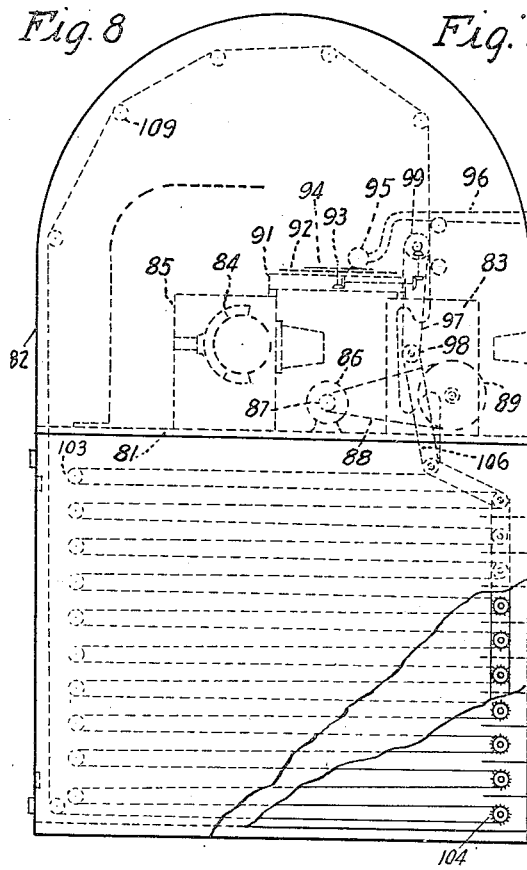
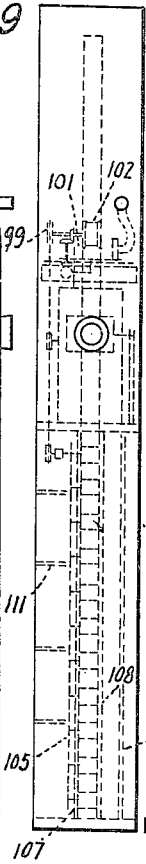
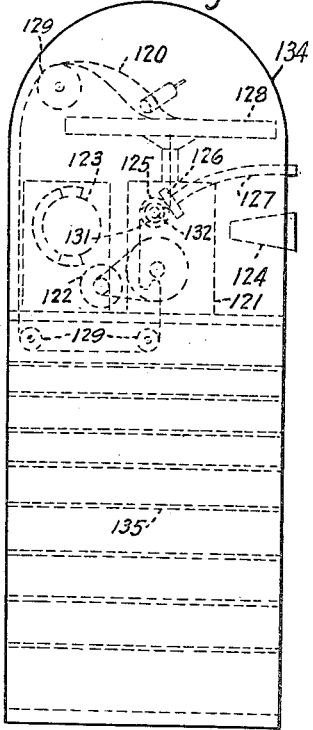
INVENTOR
George Francis Myers
BY
ATTORNEY Patented Sept. 25, 1934

1,974,688

UNITED STATES PATENT OFFICE 1,974,688

TALKING MOTION-PICTURE MACHINE

George Francis Myers, Jackson Heights, N. Y.

Application September 23, 1929, Serial No. 394,485
Renewed February 16, 1934

8 Claims. (Cl. 88—16.2)

My invention relates to apparatus for producing the illusion of talking motion pictures.

The present application is a continuation in part of my copending application Serial No. 573,864, filed July 10, 1922, since issued as Patent 1,729,048.

This present application relates to apparatus wherein the sound record is made by cutting or otherwise forming a corresponding groove in a record and operating that record so as to reproduce the sounds in synchronism with the action reproduced from the motion picture film. Three embodiments of my invention are shown in the accompanying drawings.

It is one object of my invention to provide a strip of material on which the sound record is made and a photographic film strip on which the picture record is made and to arrange apparatus so that the two strips will be operated substantially side by side.

It is another object of my invention to provide apparatus of the above indicated character in which the sound record strip and the picture record strip are wound upon the same cylinder.

It is a further object of my invention to provide apparatus whereby a completed motion picture film may be reproduced upon a screen and a sound record may be made to accompany the action of the pictures while the picture is being shown.

It is a still further object of my invention to provide a machine and sound and picture records therefor in which the stylus of the sound reproducer can be mounted adjacent the shutter of the picture projection machine.

It is a still further object of my invention to provide a photographic picture record on a strip of motion picture film and a sound record on a strip of material of different plastic composition than the film.

It is a still further object of my invention to provide a machine in which a sound record and picture record may be arranged thereon for repeated reproductions automatically time without number.

Other and further objects of my invention will be apparent from the following specification taken in conjunction with the accompanying drawings, wherein Figure 1 is an end elevation, Fig. 2 is a side elevation, and Fig. 3 is a plan view of one embodiment of my invention;

Figs. 4 and 5 are detail views of my projector shutter;

Figs. 6 and 7 are detail views of the cylinder reversing mechanism;

Figs. 8 and 9 are respectively side and front elevations of another embodiment of my invention using the flat side disc type of sound record; and Fig. 10 is a side elevation of a third embodiment of my invention using the cylinder type of sound record and a self winding film reel.

Figure 1:
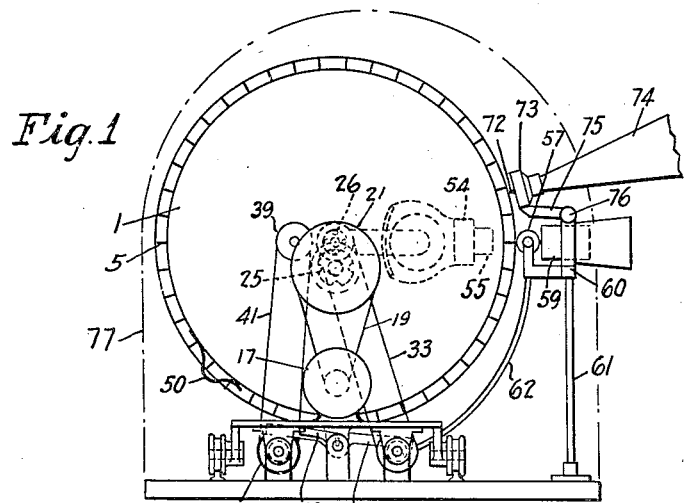

In the embodiment of my invention shown in Figs. 1 to 7, a cylindrical holder is formed by end members 1 and 2, respectively carrying annular rings 3 and 4, in which are mounted a plurality of transverse slats 5. The cylinder is rotatable, the end member 1 being provided with the shaft 6 mounted in a bearing 7 that is carried by the standard 8 mounted upon a platform 9. The end member 2 is provided with a bearing 11 that is rotatable upon a tube 12. The bearing 11 is loosely mounted upon the tube 12 so as to be slidable therealong, as will be more fully explained hereinafter. The tube 12 is supported upon the standard 13 mounted upon a base 14. The base 14 also carries a pair of track elements 15 which cooperate with the wheels 16 upon which the platform 9 is mounted.

The platform 9 carries an electric motor 17 on the shaft of which is mounted a pulley 18 from which power is transmitted by the belt 19 to pulley 21 that is mounted on stub shaft 22. The shaft 22 is carried in a bearing 23 supported on a standard 24 that is mounted upon the platform 9. On the end of the shaft 22 is a cam 25 which cooperates with a star wheel 26 that is mounted on the end of the driving shaft 6 of the cylinder. This mechanism is symbolical of mechanism to produce the desired step by step or intermittent motion of the cylinder 1, as required in motion picture projection machines. Any of the well known forms of mechanism for this purpose may be used between the motor 17 and the shaft 6. Through the intermittent motion the pictures are presented one by one in sequence to the lens of the projection machine to be described.

Since the machines of this application are intended for advertising purposes where a short subject is to be shown repeatedly without the attention of an operator I have provided an arrangement for automatically returning the aforesaid cylinder to its starting position at the termination of each run of the film. For this purpose the shaft 6 has mounted thereupon a spur gear 31 which has fast thereupon a pulley 32 that is connected by a belt 33 with a pulley 34 that is fixed upon the screw shaft 35. The gear 31 meshes with a second spur gear 36, shown best in Fig. 3, which is fast upon stub shaft 37 mounted in bracket 38 and carrying a pulley 39. The pulley 39 drives a belt 41 to rotate a pulley 42 mounted upon screw shaft 43. The screw shafts 35 and 43 extend parallel to each other and rotate in opposite directions in bearings 35' and 43' respectively.

The mechanism for reciprocating the cylinder comprises a bar 44 mounted at opposite ends in bearing 44' and bearing 45 depending from platform 9 so that bar 44 extends parallel to the shafts 35 and 43. The bar 44 has a pair of rocker arms 46 and 47 mounted near opposite ends thereof coinciding with the opposite ends of the travel of the cylinder, but so mounted as not to interfere with the movement of the platform. The platform 9 carries a cross bar 48 pivotally mounted and splined on bar 44 and having on opposite ends thereof screw threaded nut portions 49 and 49' respectively engaging screw shafts 35 and 43. It requires but a slight movement to engage and disengage the screws and nuts and it is desirable one should disengage as the other engages. The spring 50 mounted on the end member 1 of the cylinder will project far enough to engage rocker arms 46 and 47 to rotate the bar 44 slightly, which movement is communicated to the cross bar 48 by reason of the spline connection to lift and lower the nuts 49, 49'. It is apparent that this operation will be continually repeated automatically without the attention of an operator.

Referring to the projection part of my apparatus I show a bracket 51 mounted upon the tube 12 inside the cylinder. The bracket 51 supports the lamp 52 and the reflector 53 as well as the condenser lens 54 and the aperture gate 55, all within the cylinder in back of slats 5. The slats 5 are spaced around the rings 3 and 4 so as to coincide with the division between pictures on the reel or picture film 56. The shutter 57, shown in detail in Figs. 4 and 5, is mounted outside of the cylinder carrying the film 56 and in alignment with the condenser lens 54 and aperture gate 55. While the shutter may be of any well known construction I have shown a form as a cylinder having a series of apertures 58 therein, the apertures and solid portions of the shutter being properly proportioned so as to close the aperture during the shifting of the film. An objective lens 59 is also mounted outside of the cylinder carrying the film 56. The shutter 57 and objective lens 59 are mounted upon a bracket 60 supported by the stand 61 that is mounted upon the base 14. The shutter 57 is rotated from a flexible shaft 62 that is connected to one of the constantly rotating screw shafts 35 or 43.

The sound record portion of my invention is formed as follows:

A long strip of material 71 suitable for receiving a sound groove such as a wax-like material or any other plastic composition having the necessary characteristics, is spirally wound upon the slats 5 of the cylinder. As explained above the slats register with the divisions between pictures. In the embodiment here shown it will be understood that the strip 71 already has a sound groove cut therein since the machine being described is the reproducing machine, and that the sound record may have been made at the time the pictures were taken and thus properly synchronized therewith.

Or, as set forth in my aforesaid application, the sound records may be made after the picture record has been taken and during a showing of the picture, either by the same actors or a different set of actors.

Figure 2:
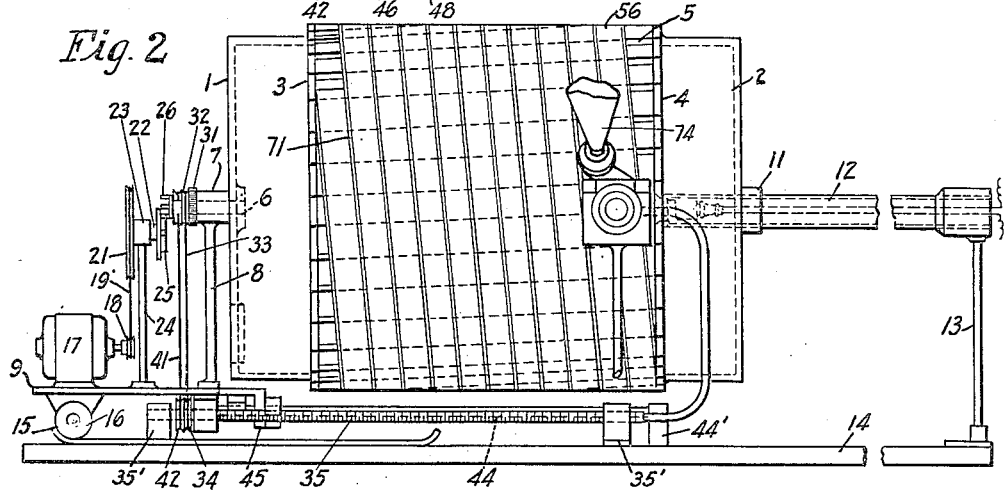
Figure 3:
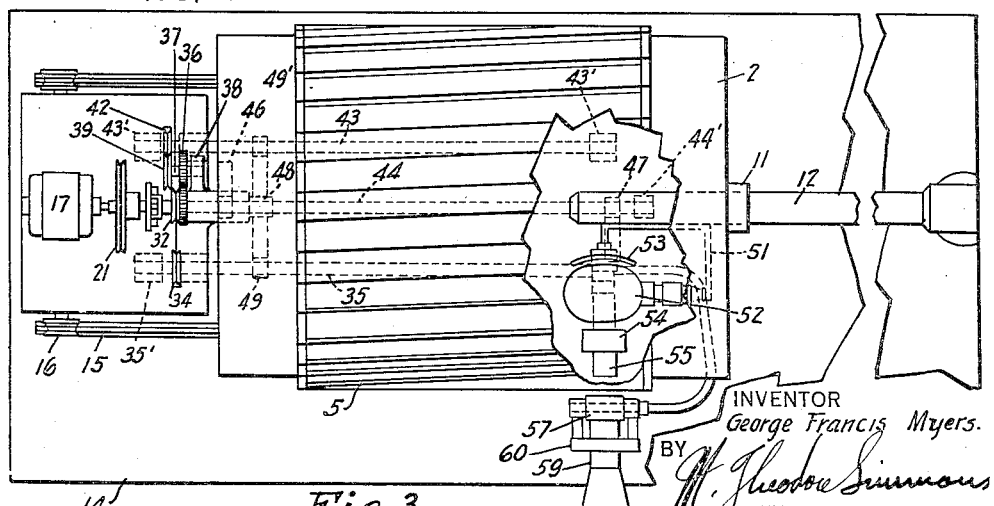

From a study of Fig. 2 it will be noted that the sound record 71 is wound upon the slats 5 and spaced thereon just the width of the picture film 56 so that the two records lie side by side upon the cylinder in continuous strips.

Assuming that the sound record is already made on the strip 71 the translation thereof into audible sound is accomplished in accordance with well known phonograph practice, here represented by the stylus 72 of the sound reproducer 73 engaging in the sound groove in the strip 71. A horn 74 is represented as symbolical of any amplifier of the audible tones. The sound reproducer 73 is mounted upon an arm 75 that is pivoted as indicated at 76 to the frame 60.

Of course, if this apparatus is to be used for the making of the sound record a suitable cutting stylus and microphonic connection will replace the sound reproducer 73 and stylus 72, and a camera mechanism will replace the projector mechanism.

From the foregoing description it will be apparent that I have provided a machine in which the sound record and the photographic record are placed side by side on the same cylinder. By providing the two records side by side a simple arrangement of sound reproducer and projector is permitted for the reproducing mechanism. The records having been made to synchronize with each other, when reproduced, the illusion of talking motion pictures will be created.

The whole apparatus may be mounted in a suitable cabinet 77 with appropriate apertures for the objective lens and sound amplifier connections.

The modification shown in Figs. 8 and 9 is directed to an embodiment of my invention in which the sound record is made upon a flat disc, such as the ordinary phonograph record, and the phonograph record is made upon the ordinary motion picture film. As this particular embodiment is also adapted for advertising purposes the film is joined together so as to form an endless film. Also in this embodiment the phonograph is driven from the projection machine.

Insofar as the projection machine and the phonograph are concerned these may be of any of the well known types. Accordingly, much of the showing of the mechanism is diagrammatic only.

The projection apparatus is mounted upon a shelf 81 on the interior of a cabinet 82. The projection apparatus generally is housed in the casing 83. In the form of projection machine shown herein the light source 84 is mounted in a casing 85 outside of the casing 83 where the film handling mechanism is located. No attempt is made to show the shutter, aperture gate film sprocket, etc., except that the path of the film through the casing 83 is indicated in dotted line.

The projection machine is driven from a motor 86 on the shaft of which is a pulley 87 transmitting power through a belt 88 to a pulley 89 on one of the shafts of the projection apparatus housed in the casing 83.

The phonograph is indicated by the housing 91 supported upon the housings 83 and 85 and carrying a turntable 92 mounted for rotation upon the shaft 93 adapted to receive the sound record 94. A sound reproducer 95 having a stylus engaging the sound record is connected to a tube 96 that leads to a sound amplifier (not shown) that is preferably located adjacent the screen upon which the pictures are being reproduced.

A belt 97 extends from a pulley 98 on one of the constantly rotating shafts of the projection apparatus to a pulley 99 mounted for rotation on a standard 101 on top of the casing 83. The pulley 99 drives a sprocket wheel 102 of the ordinary film engaging type over which the film passes into the casing 83. Pulley 99 operates several pairs of gears for rotating the turntable 92 in synchronism with the film.

The film leaves the casing 83 and passes around a series of rollers 103 and 104 arranged below the shelf in staggered relation on opposite sides of the machine. The rollers 104 are of the ordinary film sprocket type and are driven from a chain 105 which in turn is driven by a belt 106 that is operated from a pulley connected to one of the shafts of the projection apparatus. It is to be noted that the sprockets for the film 103 and 104 are arranged one above the other so that the film occupies a very narrow space in the housing in the cabinet. The rollers 103 and 104 are protected by walls 107 and 108 arranged on each side thereof, one of which is removable to permit threading of the film. Between the walls 107 and 108 are a plurality of partitions 109 to prevent damage to the film by the rollers 103 and 104. The film is lead from the lowermost roller 104 over idlers 109 around to the driving sprocket 102.

The cabinet, on either side of the compartment formed by the walls 107 and 108 may be provided with shelves 111 and vertical partitions 112 for the storage of films and records, if desired. These may be rendered accessible by having either the front wall or side wall of the cabinet provided with a door, not indicated.

When operating the machine the film will be threaded over the rollers 103 and 104 and the idler pulleys 109 and through the driving sprocket 102 and film handling apparatus in the casing 83. The sound record corresponding to the film thus threaded is placed upon the turntable and the two records are marked to start simultaneously. Since the turntable and projector are operated by the same motor, and the sound and film have been made to synchronize, then the future reproduction will be properly synchronized.

I have shown the phonograph turntable as operated from the driving sprocket of the projection machine but it is apparent that this could be operated from any other shaft of the projection or directly from the motor, if desired.

The modification shown in Fig. 10, is similar in operation to the machine of Figs. 8 and 9. The projection apparatus is housed in casing 121 and is driven by motor 122. Light source 123 and objective lens 124 cooperate therewith.

The sound record is of the cylinder type and indicated at 125. A sound reproducer 126 has a stylus cooperating with the sound record and is connected to a tube 127 leading to the sound amplifier.

The film 120 is contained in the self winding reel 128 and is led from the interior thereof through the casing 121 for reproduction and over idlers 129 onto the reel 128 on the outside thereof.

The film 120 in passing to the projection apparatus passes over a sprocket 131 mounted on the shaft 132 of the holder for the sound record 125 so that the film, in this modification, drives the sound record.

A plurality of shelves 135 is provided in the lower part of the external housing 134 for the storage of films and records, if desired.

By the term "strip" as used herein and in the claims is meant a narrow, relatively long piece of material.

Modifications may be made in the arrangement and location of parts within the spirit and scope of my invention, but such modifications are intended to be covered by the appended claims.

I claim:

1. The combination in apparatus for producing the illusion of talking motion pictures of a picture record, a sound record, a cylindrical member on which the said records are mounted spirally for reproduction side by side, and automatic means for reciprocating said member back and forth.

2. The combination in apparatus for producing the illusion of talking motion pictures of a picture record, a sound record, a cylindrical member on which the said records are mounted for reproduction side by side, a motor, operative connections between the motor and cylinder, projection apparatus for reproducing the pictures from said record, means for reciprocating the cylinder back and forth past the projection apparatus, operative connections from the motor to the reciprocating means, and a sound reproducer cooperating with said sound record.

3. The combination in apparatus for producing the illusion of talking motion pictures, of a picture record, a sound record, a cylindrical member on which the said records are mounted for reproduction side by side in spiral order, and means for reciprocating said member back and forth.

4. The combination in apparatus for producing the illusion of talking motion pictures, of a picture record, a sound record, a cylindrical member on which the said records are mounted spirally for reproduction side by side, a motor, operative connections between the motor and the cylinder, projection apparatus for reproducing the pictures from said record, means for reciprocating the cylinder back and forth past the projection apparatus, operative connections from the motor to the reciprocating means, and a sound reproducer cooperating with the sound record.

5. The combination in apparatus for producing the illusion of talking motion pictures, of a picture record, a sound record, a cylindrical member on which the said records are mounted for reproduction side by side, a motor, operative connections between the motor and the cylinder, projection apparatus for reproducing the pictures from said record, means for reciprocating the cylinder back and forth past the projection apparatus, automatic operative connections from the motor to the reciprocating means, and a second reproducer co-operating with the sound record.

6. The combination in apparatus for producing the illusion of talking motion pictures, of a picture record, a sound record, a cylindrical member on which the said records are mounted spirally for reproduction side by side, a motor, operative connections between the motor and the cylinder, projection apparatus for reproducing the pictures from said record, means for reciprocating the cylinder back and forth past the projection apparatus, automatic operative connections from the motor to the reciprocating means, and a second reproducer cooperating with the sound record.

7. The combination in apparatus for producing the illusion of talking motion pictures, of a picture record, a sound record, a cylindrical member on which the said records are mounted for reproduction side by side in spiral order, and automatic means for reciprocating said member back and forth.

8. In a machine for producing the illusion of talking motion pictures, a picture record comprising a strip of photographic film, a sound record comprising a strip of plastic material having the sound vibrations recorded therein, means for spirally mounting the two strips contiguously side by side and substantially in the same plane, a projection machine for reproducing the pictures from the film, a sound reproducer to reproduce the sound from the sound record coincidentally with the showing of the pictures to which the sound relates, and automatic means for reciprocating the first mentioned means from one side of the machine to the other.

GEORGE FRANCIS MYERS.